Oct. 18, 1949.                J. W. WEST                2,485,123
                               ICE DRILL
Filed July 15, 1944                              2 Sheets-Sheet 1

INVENTOR
John W. West
BY Churchill & Jenney
ATTORNEYS

Oct. 18, 1949.   J. W. WEST   2,485,123
ICE DRILL
Filed July 15, 1944   2 Sheets-Sheet 2

INVENTOR.
John W. West
BY Churchill & Jenney
ATTORNEYS

Patented Oct. 18, 1949

2,485,123

UNITED STATES PATENT OFFICE 2,485,123

ICE DRILL

John W. West, Bangor, Maine, assignor of one-third to Pinchos E. Medwed and one-third to Edward E. Rosen, both of Bangor, Maine Application July 15, 1944, Serial No. 545,180

1 Claim. (Cl. 255—70)

The present invention relates to drills, and more particularly to drills for drilling in ice.

The object of the present invention is to provide an ice drill which can be conveniently operated to make a hole of substantially any desired size rapidly. A secondary object is to provide a convenient form of mooring stake to be permanently left in the ice.

With these objects in view, the present invention comprises the drill hereinafter described and particularly defined in the claim.

Figures 1, 2:
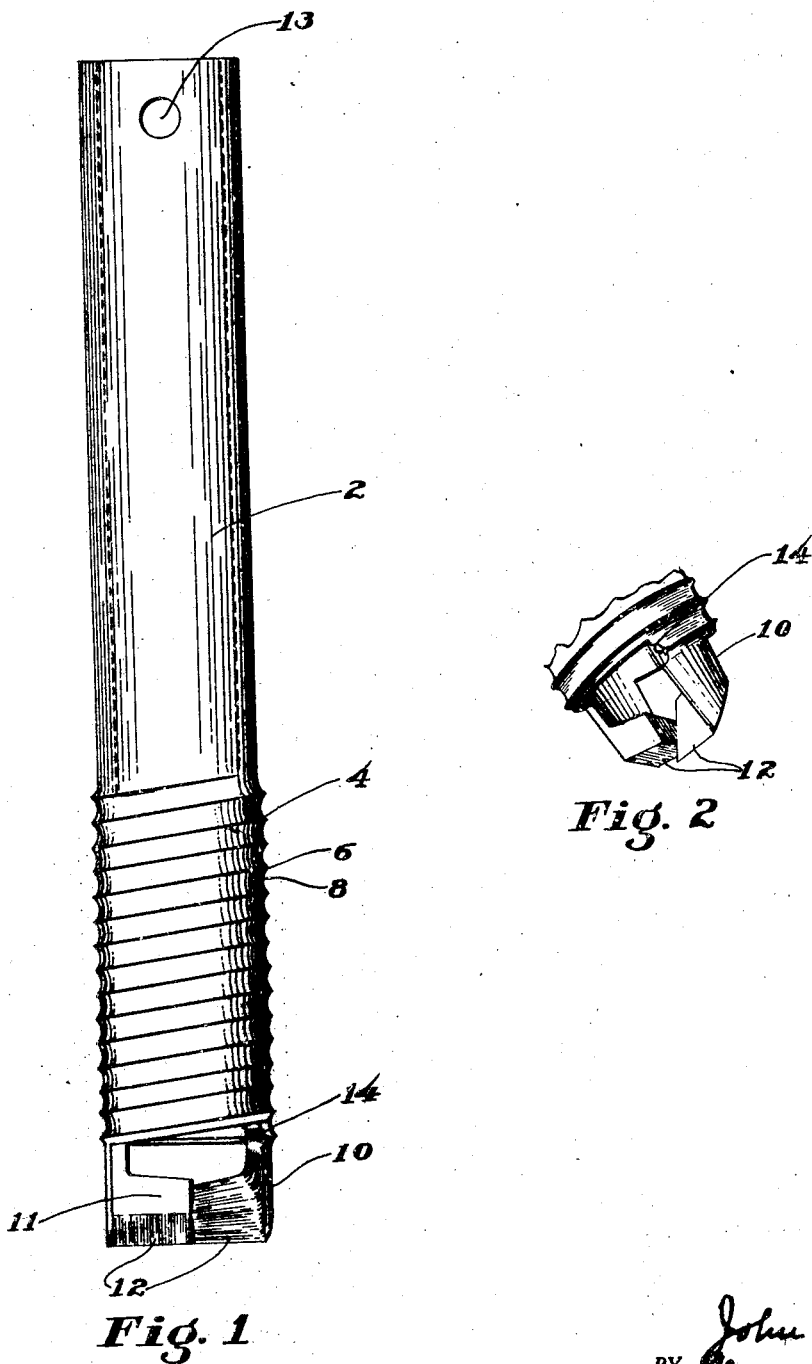
Figure 3:
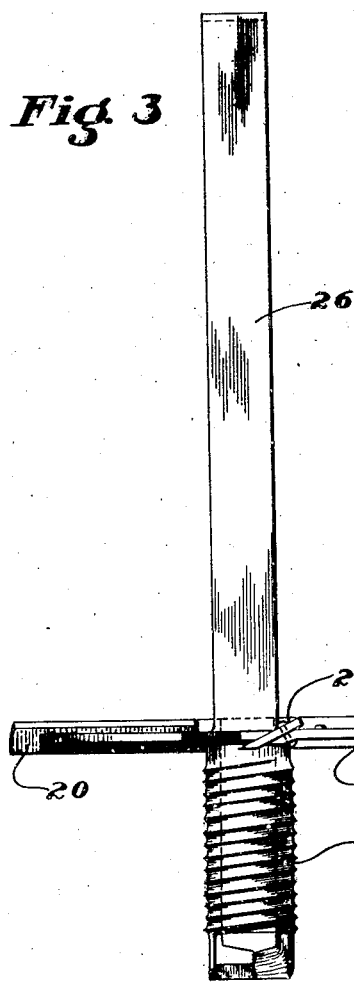
Figure 4:
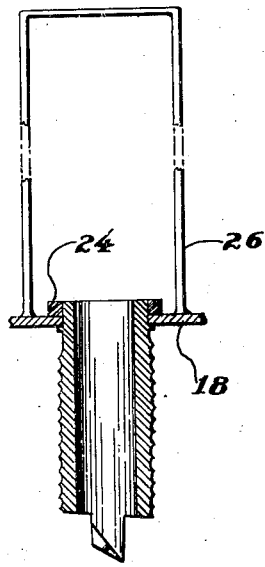
Figure 5:
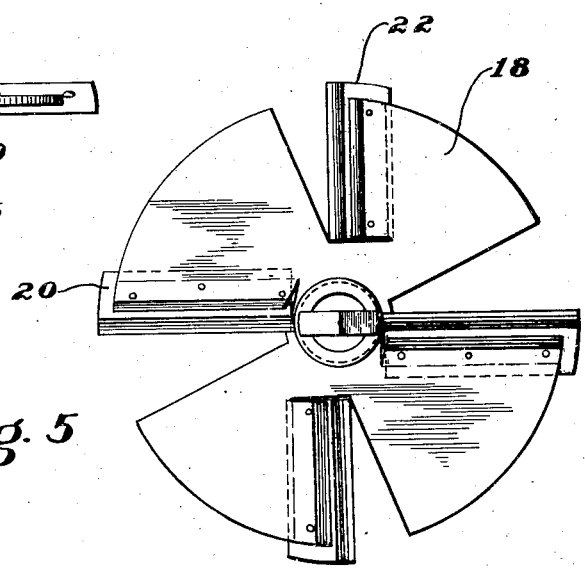

In the accompanying drawings, Fig. 1 is a side elevation of the preferred form of drill in the form of a stake; Fig. 2 is a perspective view of the end portion of the drill; Fig. 3 is a view of the cutter embodying the principles of the present invention for cutting a large hole in ice; and Fig. 4 is a sectional detail view of the device shown in Fig. 3; and Fig. 5 is a plan view of the device shown in Fig. 3.

The device shown in Figs. 1 and 2 comprises a drill for making a relatively small hole in ice, say up to two inches in diameter. As will be hereinafter described, the drill may be made as a stake and left permanently in the ice for mooring purposes.

The drill comprises a tubular member 2 formed near the lower end or for its entire length with threads 4. The threads, as shown in Fig. 1, present a relatively sharp edge 6, adjacent convolutions being connected by a smooth curve 8. At the lower end, the material is extended to form vertical knife-edge members 10. These members are arranged at diametrically opposite portions of the drill. Extending between the members 10 are inclined members 11, having two horizontal knife-edge portions 12, adapted to cut rapidly into the ice. As shown in Fig. 2, the members 11 cross in such a way that upon turning of the drill like a right hand screw, both horizontal knife edges cut into the ice. Near the top of the tubular member 2 is a hole 13 into which a rod or bar may be inserted for turning the drill.

In the use of the drill, it is placed on the ice and revolved, as by the use of a bar in the hole 13, or by the use of a suitable stock or brace. Some pressure is required initially to cut a hole deep enough to cause the screw threads 4 to engage with the ice. This initial movement is not difficult, however, if the drill is not over two inches in diameter, since the edges 10 and 12 chip the ice away rapidly. After this initial movement, the threads engage with the ice and further drilling is accomplished with slight effort.

From Figs. 1 and 2, it will be noted that the first thread starts at the upper end of one of the vertical knife edges 10, so that its entry into the ice is facilitated. As the drill is turned, the chips are forced towards the central opening and are thus cleared away from the cutting point, so that they do not impede the drilling operation. The small chip formed continually at the starting end of the screw is also forced into the central opening, and to this end, the surface in back of the starting point is relieved, as indicated at 14.

As the drilling progresses more and more convolutions of the thread engage with the ice. The operation of turning the drill therefore brings the cutting edges into further engagement with the ice, the chips being automatically cleared away through the central opening during the entire operation. The hole can be made as deep as desired and it has been found that very little additional effort is required as additional length of screw enters into engagement with the ice. As shown in Fig. 1, the threads extend only partway along the drill, the outer diameter of the threads being slightly greater than the diameter of the member 2 above the threads, so that the depth of hole is not limited to the length of the threaded portion.

The drill shown in Figs. 1 and 2 may be easily backed out when a hole of the desired depth has been made.

As a means for anchoring buildings, masts and the like, the device may be left in the ice as a stake. In such a case, the threads preferably extend the full length of the stake, or at least the full length of that portion of the stake that is to be left in the ice. It is believed that the security of the stake in the ice is due to the fact that some melting of the ice may occur as the point of the screw thread bites into the ice, and that the water thus formed freezes as soon as the drilling action is stopped.

If desired, the central opening may be slightly tapered with the larger diameter of opening at the top to guard against any jamming of the chips within the shaft. It has been found satisfactory, however, in most instances, to make the device with a straight sided opening.

A device for drilling large holes is shown in Figs. 3 to 5. For example, a hole for ice fishing is preferably about nine inches in diameter. Accordingly, there is provided a short hollow threaded section 16, similar to the device shown in Figs. 1 and 2. At the top of the drill section 16, there is mounted a generally circular head 18 carrying knife blades 20 and 22, inclined toward the surface of the ice. As shown in Fig. 5, at least one and preferably two of the blades, as indicated at 20, extends inwardly beyond the outside diameter of the threads. Other of the blades, as indicated at 22, need not tend so far inwardly, in order that space may be provided for attachment of a frame to be described presently.

The head 18 is preferably welded to a collar 24, and both the head and collar are secured to the top of the threaded member 16, preferably by welding.

Suitable means for rotating the drill are provided, here shown as a U-shaped frame 26 welded to the head 18. A bar inserted in the opening of the frame may be conveniently used to turn the drill.

As the drill is turned, the initial action is to cut the ice with the threaded section 16, exactly as for the device shown in Figs. 1 and 2, the chips being discharged upwardly through the center opening. The blades 20 and 22 ultimately move into engagement with the ice, and as the device is turned and the threads 6 advance the entrance of the drill into the ice, the large blades 20 and 22 cut the ice to form a large opening.

It will be noticed that the pitch of the large blades 20 and 22, as well as that of the end cutting blades 12, is greater than the pitch of the screw 4. The blades 12, 18 and 20, therefore, have a shaving action on the ice which can proceed with little effort, even for holes of large diameter.

I claim:

An ice drill comprising a hollow tubular member having sharp threads on its outer surface adjacent the lower end thereof, said member terminating at its lower end in diametrically oppositely positioned vertical members having vertical cutting edges extending in the direction of rotation of the drill and vertical inner surfaces which incline inwardly and rearwardly from such vertical cutting edges, each of said vertical members having an integral horizontal portion extending radially inwardly from its vertical cutting edge, said horizontal portions having horizontal cutting edges extending in the direction of rotation of the drill and upper surfaces which incline upwardly and rearwardly from such horizontal cutting edges, said upwardly inclined upper surfaces of said horizontal portions and said inwardly inclined vertical inner surfaces of said vertical members directing ice chips cut by the said cutting edges into the hollow interior of said tubular member.

JOHN W. WEST.

REFERENCES CITED

The following references are of record in the file of this patent:

UNITED STATES PATENTS

| Number | Name | Date |
| --- | --- | --- |
| 269,548 | Stephenson | Dec. 26, 1882 |
| 286,599 | Fitzgerald | Oct. 16, 1883 |
| 332,274 | Miller | Dec. 15, 1885 |
| 1,352,825 | Meredith et al. | Sept. 14, 1920 |
| 1,479,894 | Carey | Jan. 8, 1924 |
| 1,778,043 | Silberger | Oct. 14, 1930 |
| 1,857,585 | Brooks | May 10, 1930 |